United States Patent [19]
Borrel et al.

[11] 3,761,561
[45] Sept. 25, 1973

[54] PROCESS FOR THE PHOTOPOLYMERIZATION OF UNSATURATED POLYESTER RESINS ON A LIQUID METAL SUPPORT

[75] Inventors: Philippe Borrel; Jean Lehureau, both of Lyon, France

[73] Assignee: Progil, Paris, France

[22] Filed: Dec. 1, 1970

[21] Appl. No.: 94,158

[30] Foreign Application Priority Data
Jan. 21, 1970 France .............................. 7002013

[52] U.S. Cl........... 264/298, 117/93.31, 204/159.15
[51] Int. Cl............................. B29d 9/00, B01j 1/10
[58] Field of Search....................... 264/298, 10, 22; 117/93.31; 204/159.15

[56] References Cited
UNITED STATES PATENTS

| | | | |
|---|---|---|---|
| 2,579,138 | 12/1951 | Burness et al. ..................... | 264/298 |
| 2,125,374 | 8/1938 | Herrmann et al................... | 264/298 |
| 2,537,970 | 1/1951 | Fields.................................. | 264/298 |
| 3,031,721 | 5/1962 | Friedlander........................ | 264/298 |
| 2,537,969 | 1/1951 | Chynoweth......................... | 264/298 |
| 3,060,501 | 10/1962 | Beal................................... | 264/298 |
| 3,551,244 | 12/1970 | Forester et al..................... | 264/298 |

Primary Examiner—Donald J. Arnold
Attorney—Browdy & Neimark

[57] ABSTRACT

Photopolymerization of an unsaturated polyester resin is carried out on a liquid metal support which improves control of heat released during the polymerization.

5 Claims, No Drawings

PROCESS FOR THE PHOTOPOLYMERIZATION OF UNSATURATED POLYESTER RESINS ON A LIQUID METAL SUPPORT

The present invention relates to a new process for the photopolymerization of unsaturated polyester resins on a liquid metal support.

The photopolymerization of unsaturated polyester resins in the presence of a photoinitiator has long been carried out. Numerous compounds have been recommended for this purpose (Mac Closkey and Bond — Industrial and Engineering Chemistry — October 1955 — pages 2125 - 2128).

The photopolymerization reaction carried out at ordinary temperature under ultra-violet ray lamps, and in the presence of an initiator which is added to the resin, occurs under exothermic conditions which necessitate the continuous removal of the heat liberated. On account of the viscosity and the poor thermal conductivity of the resin, this liberation of heat cannot take place in a constant and uniform manner in the conventional method for carrying out the photopolymerization. More or less localized areas of overheating result, which are detrimental to the polymerized product both as regards its appearance and its mechanical properties, and as regards the appearance of internal stresses.

In order to avoid these disadvantages an attempt can be made to extend the liberation of heat over a period of time, but in so doing the duration of polymerization is detrimentally increased.

It has now become possible to avoid the phenomena of overheating by employing a special photopolymerization technique, which is the subject of the present invention. It has, in fact, now been discovered that if the polyester resin is cast onto a metal support in the liquid state and then subjected to the action of polymerizing light radiations, a polymer is obtained which presents an improved appearance and improved mechanical properties on account of the absence of internal stresses in the material.

When the unsaturated polyester resin is cast onto the liquid metal, it forms a floating layer which spreads out according to the dimensions of the receptical containing the metal. After the unsaturated polyester resin has spread out, a layer of constant thickness is obtained, the lower face of which rests on the metal and is essentially perfectly plane. Furthermore, the supporting metal contributes a marked reflecting power with regard to the light radiation, which allows the latter to be utilized better. Finally, the metal acts as a heat exchanger which allows the heat resulting from the exothermic effect of the photopolymerization reaction to be removed. The removal of the heat thus occurs in a constant and uniform manner, which avoids the local areas of overheating detrimental to the totality of the properties of the polymerized product.

According to a variant, the metal can be covered with a liquid medium which is transparent to light radiations. Under these conditions, when the resin is cast it becomes positioned between the metal and the covering liquid; its lower face rests on the metal while its upper face is in contact with the transparent liquid, the evenness being obtained by virtue of the interfacial tension between the resin and the transparent liquid. The use of the transparent liquid improves the removal of the heat, since the liquid also acts as a heat exchanger.

The metal serving as a support must be liquid, either at ordinary temperature, as in the case of mercury, or at a higher temperature, of the order of 30° to 150°C., as is the case, for example, with very fusible alloys. (Pascal-Nouveau traité de Chimie Minerale — Volume XX — 2nd part, pages 1911–1917).

The liquid medium which is possibly used, in which the layer of resin is immersed (the whole being supported by the metal liquid) must always be transparent to light radiations at the wavelengths suitable for each initiator, and have an appropriate density which allows the resin easily to be kept immersed.

Among the liquids which can be used are water, mineral oils (paraffin, vaseline, liquid petrolatum and the like), or vegetable oils having a low degree of unsaturation (stearin, palmitin, and the like). Organic solvents, used by themselves or in a mixture, and carefully chosen as a function of their boiling point, can be employed, the heat liberated by the polymerization serving to volatilize them. For example, methyl or ethyl alcohol, methylene chloride, carbon tetrachloride and monochlorobenzene are particularly suitable.

The polyester resin diluted with the cross-linking monomer can be brought into direct contact with the liquid if the latter is immiscible with it, or, if miscible, can be separated from such liquid by a thin flexible or rigid membrane, which is transparent to the light radiation and inert with respect to the various products present. Membranes of terephthalate (such as "Mylar"), cellophane, polyethylene, rubber, and the like, may for example be mentioned.

In order to carry out the invention, there may be used any unsaturated polyester resin of known type, e.g., polycondensates of unsaturated diacids or anhydrides such as maleic anhydride, maleic acid, and fumaric acid (which can contain saturated acids such as the various phthalic acids, sebacic acid, adipic acid and the like) with a diol such as ethylene glycol, propylene glycol, diethylene glycol, a chlorinated diol and the like, diluted with a polymerizable ethylenic monomer or mixture of polymerizable ethylenic monomers, such as styrene, vinyl acetate or an acrylic or allyl compound, or the like. The proportion of polymerizable monomer, relative to the resin, can vary from 25 to 70 percent by weight. This resin most frequently contains the conventional stabilizers, such as hydroquinone or its ethers.

The unsaturated polyester resin is mixed with an amount of a polymerization photoinitiator which is generally between 0.01 and 10 percent of its weight, preferably between 0.05 and 2 percent. Among the initiators of known type, there may be mentioned, for example, diacetyl, dibenzoyl, benzophenone or, preferably, benzoin or an alkyl ether of benzoin, as, for example, the methyl, ethyl or propyl ethers of benzoin. Substances which generate free radicals, such as for example organic peroxides, azo derivatives, and the like, can optionally be added to these initiators.

Wavelengths of the ultra-violet radiations generally used are between 1,500 and 5,000 Angstrom, preferably between 3,000 and 4,000 Angstrom.

This technique of photopolymerization can be used in accordance with a discontinuous or continuous process. In the latter case, the resin is fed continuously onto the liquid metal support, in such a way as to form a continuous band of resin floating on the liquid metal surface. After this band has spread out on the surface of the metal, it presents a uniform thickness. The spreading out can be limited by walls which are not wetted by the resin. The same process can be used when a covering liquid is employed according to the above-mentioned variant. In this case, the resin is fed continuously onto the metal covered by the liquid, and forms a band floating between the metal surface and the covering liquid.

The band of resin, of defined thickness and width, is then subjected, in the course of irradiation, to a constant traction in order to be drawn from the reaction chamber. A calibrated band of polymerized resin is thus obtained. This traction effect on the polymerized resin facilitates and controls the spreading-out of the resin which is not yet polymerized.

The process of the invention can be carried out using only the liquid metal support and in the absence of a liquid medium covering it, for example, in the manufacture of thin films or sheets of polymerized resin, when it is desired to manufacture a relatively thick material, it is advisable to add this liquid medium so as further to improve the uniform heat exchange and to avoid all appearance of internal stresses.

The technique which has been developed is very valuable for obtaining plane sheets of unsaturated polyester resins; it can also be used to obtain plane laminates.

The following examples show how the invention can be carried out.

EXAMPLE 1

An unsaturated polyester resin was prepared by diluting 64 parts by weight of a polycondensate of 1 mol. of phthalic anhydride and 1 mol of maleic anhydride with 2.2 mols of propylene glycol with 36 parts by weight of styrene. The resin was mixed with 0.01 percent of hydroquinone as stabilizer and with 0.1 percent of the ethyl 2.2 of benzoin as photoinitiator. This resin was then cast into a dish containing mercury, and exposed for 8 minutes to radiation from Philips HTQ 4, 1 kilowatt lamps, under a wavelength of 3,600 Angstrom, placed 40 cm. from the support. A sheet of resin was obtained, and examination in polarized light showed that it was completely free from internal stresses.

By way of comparison, the experiment of the preceding example was repeated, but replacing the mercury by a polished aluminum sheet. Examination in polarized light of the sheet of resin obtained, showed numerous internal stresses.

EXAMPLE 2

A resin composition mixed with stabilizer and photoinitiator, identical to example 1, was cast into a dish containing mercury covered with a vaseline oil. After the resin had spread out, it formed a uniform intermediate layer between the mercury and the oil. It was then exposed for 8 minutes to radiation from Philips HTQ 4 lamps, placed 40 cm. from the support.

After irradiation, a sheet of resin was obtained, and examination in polarized light showed that it was completely free from internal stresses.

EXAMPLE 3

A metal alloy having the following composition was prepared:

Bismuth . . . 15 parts by weight
Lead . . . . . . 8.5 parts by weight
Tin . . . . . . . 4 parts by weight
Cadmium . . . 3 parts by weight This alloy was melted at 70°C. and kept at this temperature in a dish. It was then covered with water. The bath formed was fed continuously with the resin of Example 1. This resin, which lined the surface of intersection of the 2 elements of the bath, assumed the form of a uniform layer having plane surfaces.

After the resin had spread out, it was subjected to radiation from a series of Philips HTQ 4 lamps, placed at a distance of 40 cm. The band of polymerized resin formed was then taken up by a mechanical device, thereby allowing it to be extracted from the bath. A continuous plane sheet of resin was thus obtained, the examination of samples of which in polarized light showed that it did not exhibit any internal stresses.

It will be obvious to those skilled in the art that various changes may be made without departing from the scope of the invention and the invention is not to be considered limited to what is described in the specification. What is claimed is:

1. In a process for the photopoly-merization of an unsaturated polyester resin, by exposing said resin to light radiations in the presence of a photosensitive initiator effective for initiating the photopolymerization of unsaturated polyester, the improvement comprising casting said resin onto a layer of liquid metal which is liquid at a temperature below 150°C.; providing above said resin without mixing with said resin a liquid which is transparent to light radiations and which has a density less than the density of said polyester so that the resin cast on the metal support forms a floating layer intermediate between said metal and said transparent liquid and distinct from said transparent liquid; and then carrying out said photopolymerization.

2. Process according to claim 1 in which the resin is brought into direct contact with the covering liquid and said liquid is immiscible with said resin.

3. Process according to claim 1 in which the resin and the covering liquid are separated by a thin membrane transparent to light radiation in the range of 1,500–5,000 Angstroms and inert with respect to said polyester and said covering liquid.

4. Process according to claim 1 in which the covering liquid is selected from the group consisting of water, mineral oil, vegatable oil, methyl alcohol, ethyl alcohol, methylene chloride, carbon tetrachloride and monochlorobenzene.

5. Process according to claim 1 in which the unsaturated polyester resin consists essentially of a polycondensate of an unsaturated diacid or anhydride with a diol, the polycondensate being diluted with 25–70 percent by weight of a polymerizable ethylenic monomer.

* * * * *